United States Patent
Challa et al.

(10) Patent No.: US 10,411,600 B1
(45) Date of Patent: Sep. 10, 2019

(54) APPARATUS AND METHODS FOR CONVERTER MODE AND LOAD CONFIGURATION CONTROL

(71) Applicant: Allegro MicroSystems, LLC, Manchester, NH (US)

(72) Inventors: Sutej Reddy Challa, Bedford, NH (US); Richard Garvey, Amherst, NH (US); George P. Humphrey, Merrimack, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/259,103

(22) Filed: Jan. 28, 2019

(51) Int. Cl.
| | |
|---|---|
| *H02M 3/158* | (2006.01) |
| *B60Q 1/076* | (2006.01) |
| *H05B 33/08* | (2006.01) |

(52) U.S. Cl.
CPC .......... *H02M 3/1582* (2013.01); *B60Q 1/076* (2013.01); *H05B 33/0812* (2013.01); *H05B 33/0827* (2013.01)

(58) Field of Classification Search
CPC .... H02M 3/156; H02M 3/1563; H02M 3/158; H05B 33/0806; H05B 33/0812; H05B 33/0815; H05B 33/0827; H05B 33/0842; H05B 33/0848; B60Q 1/0076; B60Q 1/076

See application file for complete search history.

(56) References Cited

U.S. PATENT DOCUMENTS

| | | | |
|---|---|---|---|
| 6,982,527 B2 | 1/2006 | Lee et al. | |
| 7,915,870 B2 * | 3/2011 | Grandry | G01R 19/16519 323/222 |
| 8,339,049 B2 | 12/2012 | Kang et al. | |
| 8,456,105 B2 | 6/2013 | Wang et al. | |
| 8,519,630 B2 | 8/2013 | Wang et al. | |
| 8,664,930 B2 | 3/2014 | Kang et al. | |
| 8,742,682 B1 | 6/2014 | Wang et al. | |
| 8,779,805 B1 | 7/2014 | Fernandez et al. | |
| 8,901,835 B2 | 12/2014 | Kang et al. | |
| 8,928,256 B2 | 1/2015 | Smith | |

(Continued)

FOREIGN PATENT DOCUMENTS

WO WO-2009147563 A2 * 12/2009 ......... H05B 33/0815

OTHER PUBLICATIONS

Linear Technology datasheet LT3965 "8-Switch Matrix LED Dimmer" 2016, 24 pages.

(Continued)

*Primary Examiner* — Matthew V Nguyen
(74) *Attorney, Agent, or Firm* — Daly, Crowley, Mofford & Durkee, LLP

(57) ABSTRACT

A driver coupled to a configurable load having a first load portion coupled to a second load portion at an intermediate node includes a first switch coupled to the intermediate node and to a battery voltage, and a second switch coupled to the second load portion and ground. A current steering control circuit of the driver is responsive to a feedback voltage associated with the intermediate node and is configured to generate a first switch control signal and a second switch control signal to control a slew rate of either the first switch or the second switch. The current steering control circuit can include a gate driver and a current steering amplifier.

17 Claims, 7 Drawing Sheets

(56) References Cited

U.S. PATENT DOCUMENTS

| | | |
|---|---|---|
| 8,937,433 B1 | 1/2015 | Wang et al. |
| 9,294,084 B1 | 3/2016 | McIntosh et al. |
| 9,425,785 B1 | 8/2016 | Wibben |
| 9,538,601 B1 | 1/2017 | Mangtani et al. |
| 9,621,036 B2 | 4/2017 | Wibben |
| 9,621,041 B2 | 4/2017 | Sun et al. |
| 9,781,789 B1 | 10/2017 | Lee et al. |
| 2004/0075393 A1 | 4/2004 | Ito et al. |
| 2005/0243022 A1 | 11/2005 | Negru |
| 2010/0026208 A1 | 2/2010 | Shteynberg et al. |
| 2011/0068701 A1 | 3/2011 | van de Ven et al. |
| 2011/0148374 A1 | 6/2011 | Gizara |
| 2011/0215731 A1 | 9/2011 | Jeong et al. |
| 2012/0104952 A1 | 5/2012 | Chen |
| 2012/0299500 A1 | 11/2012 | Sadwick et al. |
| 2013/0127354 A1 | 5/2013 | Chiang et al. |
| 2013/0257313 A1 | 10/2013 | Battaglia |
| 2013/0341653 A1 | 12/2013 | Yuan et al. |
| 2015/0163877 A1 | 6/2015 | Bordin et al. |
| 2015/0208469 A1 | 7/2015 | Coetzee et al. |
| 2015/0208476 A1 | 7/2015 | Muramatsu et al. |
| 2016/0049939 A1 | 2/2016 | Martin et al. |
| 2016/0165696 A1 | 6/2016 | Rodriguez et al. |
| 2016/0200245 A1 | 7/2016 | Rivas et al. |
| 2016/0318439 A1 | 11/2016 | Levasseur |
| 2017/0201086 A1 | 7/2017 | Chen et al. |
| 2018/0049283 A1 | 2/2018 | Lee |
| 2018/0220502 A1* | 8/2018 | Morales ............... H05B 33/083 |

OTHER PUBLICATIONS

Texas Instruments datasheet TPS92661-Q1 "High-Brightness LED Matrix Manager for Automotive Headlight Systems", Sep. 2014, 53 pages.

Office Action dated Jan. 13, 2017 for U.S. Appl. No. 15/154,372; 17 pages.

Response to Office Action dated Apr. 10, 2017 for U.S. Appl. No. 15/154,372; 13 pages.

Notice of Allowance dated Jun. 21, 2017 2017 for U.S. Appl. No. 15/154,372; 13 pages.

Office Action dated Jun. 1, 2018 for U.S. Appl. No. 15/722,238; 36 pages.

Response to Office Action filed Aug. 1, 2018 for U.S. Appl. No. 15/722,238; 14 pages.

Final Office Action dated Nov. 1, 2018 for U.S. Appl. No. 15/722,238; 44 pages.

Response to Final Office Action filed Jan. 18, 2019 for U.S. App. No. 15/722,238; 12 pages.

Advisory Action dated Jan. 29, 2019 for U.S. Appl. No. 15/722,238; 6 pages.

Response to Final Office Action filed Feb. 1, 2019 for U.S. Appl. No. 15/722,238; 12 pages.

Office Action dated Mar. 6, 2019 for U.S. Appl. No. 15/722,238; 31 pages.

Notice of Allowance dated Jul. 2, 2019 for U.S. Appl. No. 15/722,238; 10 Pages.

Response to Office Action dated Mar. 6, 2019 for U.S Appl. No. 15/722,238, filed May 29, 2019; 14 Pages.

\* cited by examiner

APPARATUS AND METHODS FOR CONVERTER MODE AND LOAD CONFIGURATION CONTROL

CROSS REFERENCE TO RELATED APPLICATIONS

Not Applicable.

STATEMENT REGARDING FEDERALLY SPONSORED RESEARCH

Not Applicable.

FIELD

The present disclosure relates generally to drivers and more particularly, to drivers for controlling a converter mode of operation and a load configuration with smooth transitions.

BACKGROUND

DC-DC converters are used in a wide range of applications to provide a regulated output voltage from a battery or other power source. Switch-mode or switching DC-DC converters use an energy storage device, such as an inductor, to store the input energy and switches to selectively couple the energy storage device to the output.

Common switching converter topologies include Boost and Buck-Boost. In Boost converters, the output voltage across the load is higher than the input voltage and in Buck-Boost converters, the output voltage across the load can be either higher or lower than the input voltage. Boost converters are governed by the transfer function Vout=Vin/(1−D), where D is the duty cycle of the power switch and generally have better efficiency than Buck-Boost converters. The Buck-Boost converter transfer function is given by Vout=Vin (D/1−D). Buck-Boost converters are advantageous because of their flexibility in output voltage, but generally impose higher voltage stress on the power switch and have higher power losses.

Typical LED systems include an application specific number and configuration of LEDs, a switching regulator to provide a controlled current to the LED load, and a controller to control the regulator. Some LED applications require the use of multiple parallel strings of series-coupled LEDs and others require only a single string of series-coupled LEDs. Generally controlling the LED current is simpler in the case of a single LED string since the regulator can provide a controlled current to the LED string based on a simple feedback arrangement, such as sensing the voltage across a sense resistor coupled in series with the load.

In some applications for single string LED loads, a bypass or shunt switch may be used to selectively switch in and out a portion of the LEDs in order to achieve different illumination levels. One such application is in automotive headlamps in which part of the LED string can be selectively switched in and out in order to toggle between high beam operation and low beam operation of the headlamps.

SUMMARY

The present disclosure provides an LED driver with improved performance by controlling the slew rate of switches during transitions between different converter topologies with a current steering gate driver in a manner that minimizes LED current deviations. The slew rate of only one of a high impedance path switch and a low impedance path switch is controlled at a time, depending upon the relative voltage between the load and the battery. An overlap time interval allows for smooth converter topology transitions.

According to the disclosure, a driver coupled to a configurable load having a first load portion coupled to a second load portion at an intermediate node includes a first switch (e.g., p-channel MOSFET, PMOSFET) having a first terminal coupled to the intermediate node of the load and a second terminal coupled to the battery voltage and not coupled to the second load portion, a second switch (e.g., n-channel MOSFET, NMOSFET) having a first terminal coupled to the second load portion and a second terminal coupled to a reference potential, and a current steering control circuit. The current steering control circuit is responsive to a feedback voltage associated with the intermediate node and is configured to generate a first switch control signal for coupling to a control terminal (e.g., gate terminal) of the first switch and a second switch control signal for coupling to a control terminal (e.g., gate terminal) of the second switch.

Features may include one or more of the following individually or in combination with other features. The first and second switch control signals can cause the first switch to be on and the second switch to be off during a Buck-Boost mode of converter operation and cause the second switch to be on and the first switch to be off during a Boost mode of converter operation. The load can comprise a headlamp, wherein the first load portion comprises a first plurality of series-coupled LEDs corresponding to a low beam configuration in which the converter is in the Buck-Boost mode of operation and wherein the second load portion comprises a second plurality of series-coupled LEDs that, with the first plurality of series-coupled LEDs, correspond to a high beam configuration in which the converter is in the Boost mode of operation. The current steering control circuit can be configured to detect a rate of change of the feedback voltage and control a slew rate of the first switch control signal and the second switch control signal based on the detected rate of change of the feedback voltage. The current steering control circuit can be configured to control the slew rate of only one of the first switch control signal or the second switch control signal during a transition between the Buck-Boost mode of operation and the Boost mode of operation. For each of the first switch and the second switch, the current steering control circuit can comprise a gate driver having an input responsive to a converter configuration control signal that controls a configuration of the load and an output at which the respective switch control signal is provided and a current steering amplifier having an input coupled to the intermediate node through a negative feedback element and an output coupled to the control terminal (e.g., gate terminal) of the respective switch. The driver can further include an RC circuit having a capacitor coupled to the intermediate node of the load and a resistor coupled between the capacitor and a reference voltage, wherein the feedback voltage is provided between the capacitor and the resistor. The resistor can comprise a variable resistor selected to establish the slew rate of the first switch control signal and the second switch control signal.

Also described is a method of configuring a load having a first load portion coupled to a second load portion at an intermediate node, the load powered by a load voltage generated by a converter powered by a battery voltage, the method including controlling a first switch having a first terminal coupled to the intermediate node of the load and a second terminal coupled to the battery voltage and not coupled to the second load portion and a second switch having a first terminal coupled to the second load portion and a second terminal coupled to a reference potential so that the first switch is on and the second switch is off during a Buck-Boost mode of converter operation and so that the first switch is off and the second switch is on during a Boost mode of converter operation. The method further includes steering a current at an output of a gate driver coupled to the intermediate node by a current steering control circuit responsive to a feedback voltage associated with the intermediate node.

The method can further include generating a first switch control signal, by the current steering control circuit, for coupling to a control terminal of the first switch in response to a rate of change of the feedback voltage associated with the intermediate node and generating a second switch control signal, by the current steering control circuit, for coupling to a control terminal of the second switch in response to the rate of change of the feedback voltage associated with the intermediate node. During a transition of the converter into the Buck-Boost mode of operation, the first switch control signal controls the slew rate of the first switch and the second switch control signal does not control the slew rate of the second switch if a voltage at the intermediate node is greater than the battery voltage and the first switch control signal does not control the slew rate of the first switch and the second switch control signal controls the slew rate of the second switch if the voltage at the intermediate node is less than the battery voltage. Each of controlling the slew rate of the first switch and the second switch includes generating a gate drive signal with a gate driver having an input responsive to a converter configuration control signal that controls a configuration of the load and an output at which the respective switch control signal is provided and steering the current at the output of the gate driver with a current steering amplifier having an input coupled to the intermediate node through a negative feedback element and an output coupled to the control terminal of the respective switch.

According to a further aspect, apparatus for configuring a load having a first load portion coupled to a second load portion at an intermediate node includes means for controlling a first switch having a first terminal coupled to the intermediate node of the load and a second terminal coupled to the battery voltage and not coupled to the second load portion and a second switch having a first terminal coupled to the second load portion and a second terminal coupled to a reference potential so that the first switch is on and the second switch is off during a Buck-Boost mode of converter operation and so that the first switch is off and the second switch is on during a Boost mode of converter operation. The apparatus includes means for steering a current at an output of a gate driver coupled to the intermediate node responsive to a feedback voltage associated with the intermediate node. The controlling means includes means for generating a first switch control signal for coupling to a control terminal of the first switch in response to a rate of change of the feedback voltage associated with the intermediate node and means for generating a second switch control signal for coupling to a control terminal of the second switch in response to the rate of change of the feedback voltage associated with the intermediate node. During a transition of the converter into the Buck-Boost mode of operation, the first switch control signal controls the slew rate of the first switch and the second switch control signal does not control the slew rate of the second switch if a voltage at the intermediate node is greater than the battery voltage and the first switch control signal does not control the slew rate of the first switch and the second switch control signal controls the slew rate of the second switch if the voltage at the intermediate node is less than the battery voltage. Each of the controlling means includes means for generating a gate drive signal with a gate driver having an input responsive to a converter configuration control signal that controls a configuration of the load and an output at which the respective switch control signal is provided and means for steering the current at the output of the gate driver with a current steering amplifier having an input coupled to the intermediate node through a negative feedback element and an output coupled to the control terminal of the respective switch.

BRIEF DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
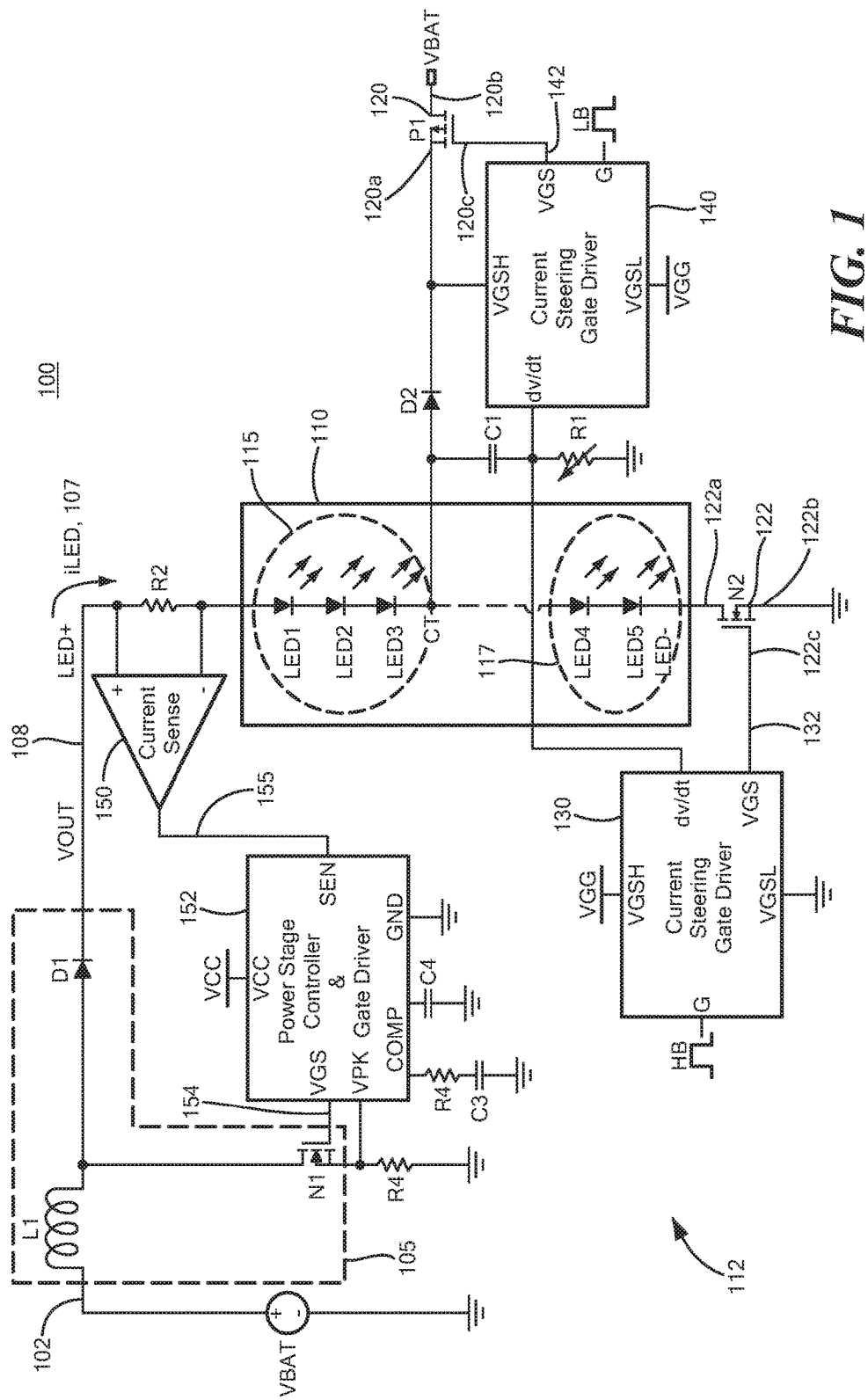
FIG. 1 is a block diagram of a circuit including a driver coupled to a dual-mode converter for powering a configurable load, according to the present disclosure.

Referring to FIG. 1, a system 100 including a driver 112 coupled to a dual-mode converter 105 for powering a configurable load 110 is shown. The configurable load may, for example, comprise a plurality of light emitting diodes (LEDs). The converter 105 receives power from a supply, or battery voltage VBAT 102 and is configured to generate a regulated output voltage VOUT 108 for coupling to the load 110. The driver 112 includes first and second switches 120 and 122, power stage controller and gate driver 152, current steering gate driver 130 coupled to second switch 122, and current steering gate driver 140 coupled to first switch 120. The driver 112 may be provided in the form of an integrated circuit (IC) and the particular delineation of circuit elements internal and external to the IC may be varied to suit a particular application.

The converter 105 can operate in different modes and in particular can operate in a Boost mode by closing the second switch 122 and opening the first switch 120 to provide a higher output voltage VOUT 108 than battery voltage VBAT 102 or in a Buck-Boost mode by opening the second switch 122 and closing the first switch 120 to provide an output voltage VOUT 108 across the load that may be higher or lower than the battery voltage VBAT 102. The first switch 120 may be referred to herein as a "Buck-Boost" switch, as it controls the Buck-Boost mode of operation, and the second switch 122 may be referred to herein as a "Boost" switch, as it controls the Boost mode of operation of the system 100.

In operation, regulator 105 is controlled by the output 154 of driver 152 so as to adjust the output voltage VOUT 108 as necessary to maintain a substantially constant load current iLED 107 to the load 110. The regulator 105 and its control circuitry (a current sense amplifier 150 and power stage controller and gate driver 152) may implement various types of control schemes such as pulse-width modulation (PWM) control, including current mode control or voltage mode control various topologies, including but not limited to SEPIC and synchronous converter topologies. Here, a sense resistor R2 coupled between the regulator output VOUT 108 and the load 110 provides a sense voltage to current sense amplifier 150. The current sense amplifier 150 provides a current error signal 155 to the power stage controller and gate driver 152 that generates a control signal 154 for controlling the converter switch.

The configurable load 110 includes a first load portion 115 (for example, comprising three LEDs LED1, LED2, LED3) and a second load portion 117 (for example, comprising two LEDs LED4, LED5) coupled together at an intermediate node CT of the load 110. Although only five LEDS are shown, any number of LEDs can be provided in accordance with the techniques of the present disclosure. The load 110 is powered by the regulated voltage VOUT 108 generated by the converter 105.

The load 110 can comprise a headlamp or other dual-mode lighting system in some embodiments, where the first load portion 115 comprises a first plurality of series-coupled LEDs corresponding to a low beam (or first mode) configuration in which the converter is in the Buck-Boost mode of operation and wherein the second load portion 117 comprises a second plurality of series-coupled LEDS that, together with the first plurality of series-coupled LEDs, correspond to a high beam (or second mode) configuration in which the converter is in the Boost mode of operation. It will be appreciated that the term "headlamp" may refer to an automotive headlamp (e.g., headlight or other automotive light) assembly, a personal headlamp (e.g., flashlight device) to be placed on a wearer's head or other portion of their body, or another dual-mode lighting device.

The first, Buck-Boost switch (P1) 120 has a first terminal 120a coupled, through a diode D2, to the intermediate node CT of the load and a second terminal 120b coupled to the battery voltage VBAT 102. The second terminal 120b is not coupled to the second load portion 117 of the load 110. A control terminal 120c of the switch 120 is coupled to receive a control signal from the current steering gate driver 140. The Buck-Boost switch 120 can be a P-Type Metal-Oxide-Semiconductor Field Effect Transistor (PMOS) device.

The second, Boost switch (N2) 122 has a first terminal 122a coupled to the second load portion 117 and a second terminal 122b coupled to a reference potential (e.g., ground). A control terminal 122c of the Boost switch 122 is coupled to receive a control signal from the current steering gate driver 130. The second Boost switch 122 can be a N-Type Metal-Oxide-Semiconductor Field Effect Transistor (NMOS) device.

The current steering gate driver 130 for the Boost switch 122 and the current steering gate driver 140 for the Buck-Boost switch 120 are each responsive to a feedback voltage (dv/dt) associated with the intermediate load node CT. The current steering gate driver 130 further is responsive to a converter configuration control signal "HB" to indicate that the system should enter (or exit) a Boost mode of operation where the high beams are turned on (or off). The current steering gate driver 140 is further responsive to a converter configuration control signal "LB" to indicate that the system should enter (or exit) a Buck-Boost mode of operation where the low beams are turned on (or off).

The current steering gate driver 140 is configured to generate a first switch control signal 142 for coupling to the control terminal 120c of the first switch 120, and the current steering gate driver 130 is configured to generate a second switch control signal 132 for coupling to the control terminal 122c of the second switch 122. The current steering gate drivers 130, 140 will be described in detail below in connection with FIGS. 2 and 3, respectively. Suffice it to say here that the drivers 130, 140 are configured to detect a rate of change of the feedback voltage (dv/dt) and to establish the slew rate of the first switch control signal and the second switch control signal based on the detected rate of change of the feedback voltage. With this arrangement and as further described below, the load configuration and the converter operational mode are controllable in a manner that achieves smooth transitions between the switches 120, 122 turning on and off by selectively and independently controlling the slew rate of the switches so as to reduce and/or eliminate potentially damaging inrush currents to the load and also to minimize load current undershoot that can otherwise occur. As described further below, during transitions between Boost mode and Buck-Boost mode or vice versa, the slew rate of only one of the switches 120, 122 is controlled thereby achieving a smooth transition without unnecessary delay.

The current steering gate driver 130 and current steering gate driver 140 may be referred to collectively as a "current steering control circuit" herein. Although two distinct current steering gate drivers 130, 140 are shown, it will be appreciated that in some embodiments these can be replaced with a single current steering gate driver coupled to both the control terminal of the first switch and the control terminal of the second switch.

The current steering control circuit (gate drivers 130, 140) is configured to detect a range of change of the feedback voltage (dv/dt) and control a slew rate of the first switch control signal 142 and the second switch control signal 132 based in part on the detected rate of change of the feedback voltage. To this end, the system 100 can include a slope detector including an RC circuit having a capacitor C1 coupled to the intermediate node CT of the load 110 and a resistor R1 coupled between the capacitor and a reference potential (e.g., ground). The feedback voltage (dv/dt) is provided between the capacitor C1 and the resistor R1. The resistance of resistor R1 and/or the capacitance of capacitor C1 can be adjustable in order to thereby adjust the slew rate of the switch control signals 132, 142. By changing the resistance and/or capacitance, the gain of slope detector can be varied to achieve a desired switch transition time. Furthermore, the resistor R1 and/or capacitor C1 can be internal to an integrated circuit driver 112 or alternatively can be external components. The resistance and/or capacitance can be preset or predetermined or can be user selectable or programmable or otherwise provided from an external source. Refer to FIGS. 2A and 2B showing the effect of changing the resistor value R1 on the slew rate of the switch. These slew rate graphs are applicable to both the first switch 120 and the second switch 122.

Figure 4:
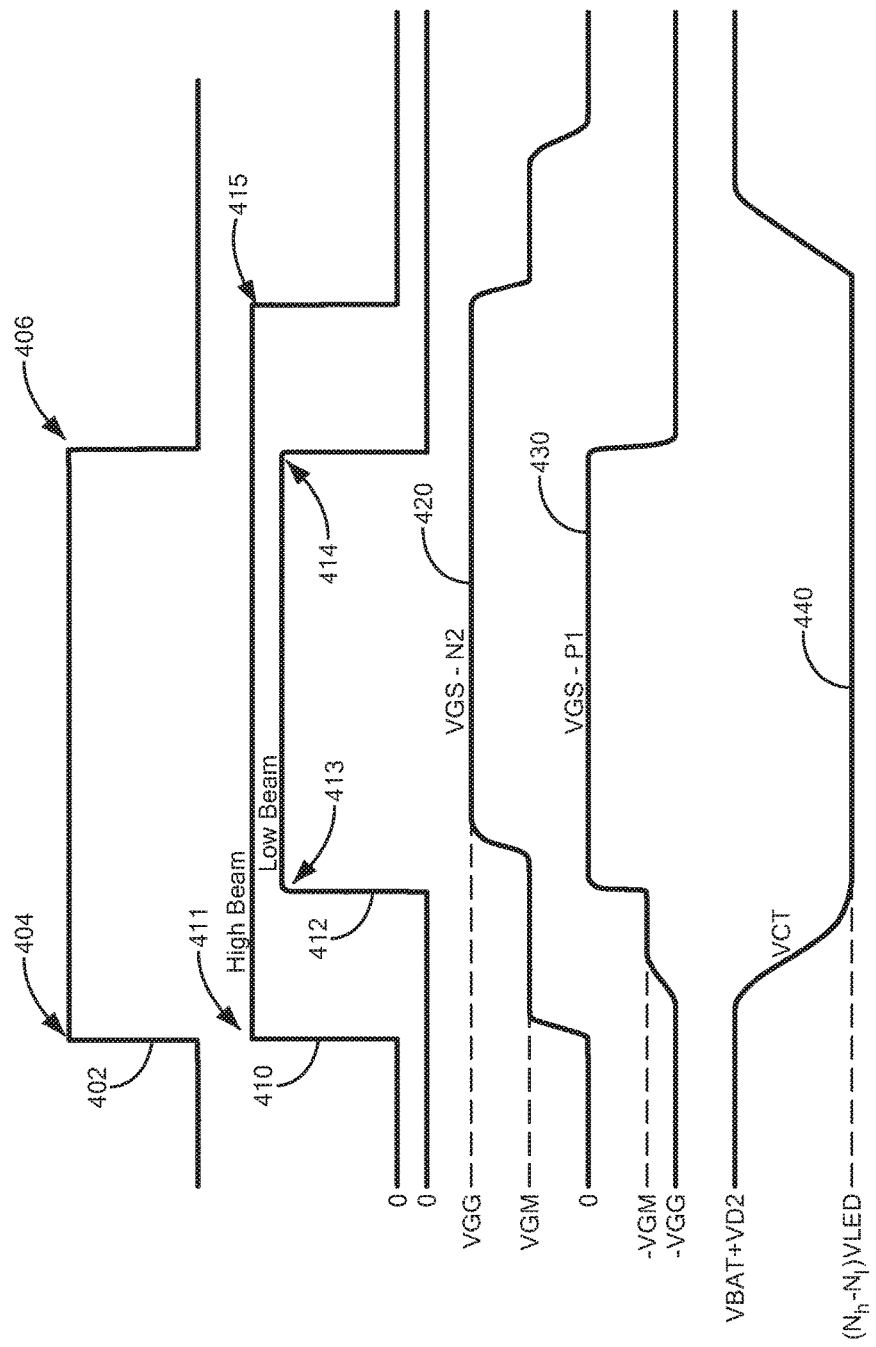
FIG. 4 shows waveforms associated with the circuit of FIG. 1 when the battery voltage is greater than the intermediate node voltage, according to the present disclosure.
Figure 5:
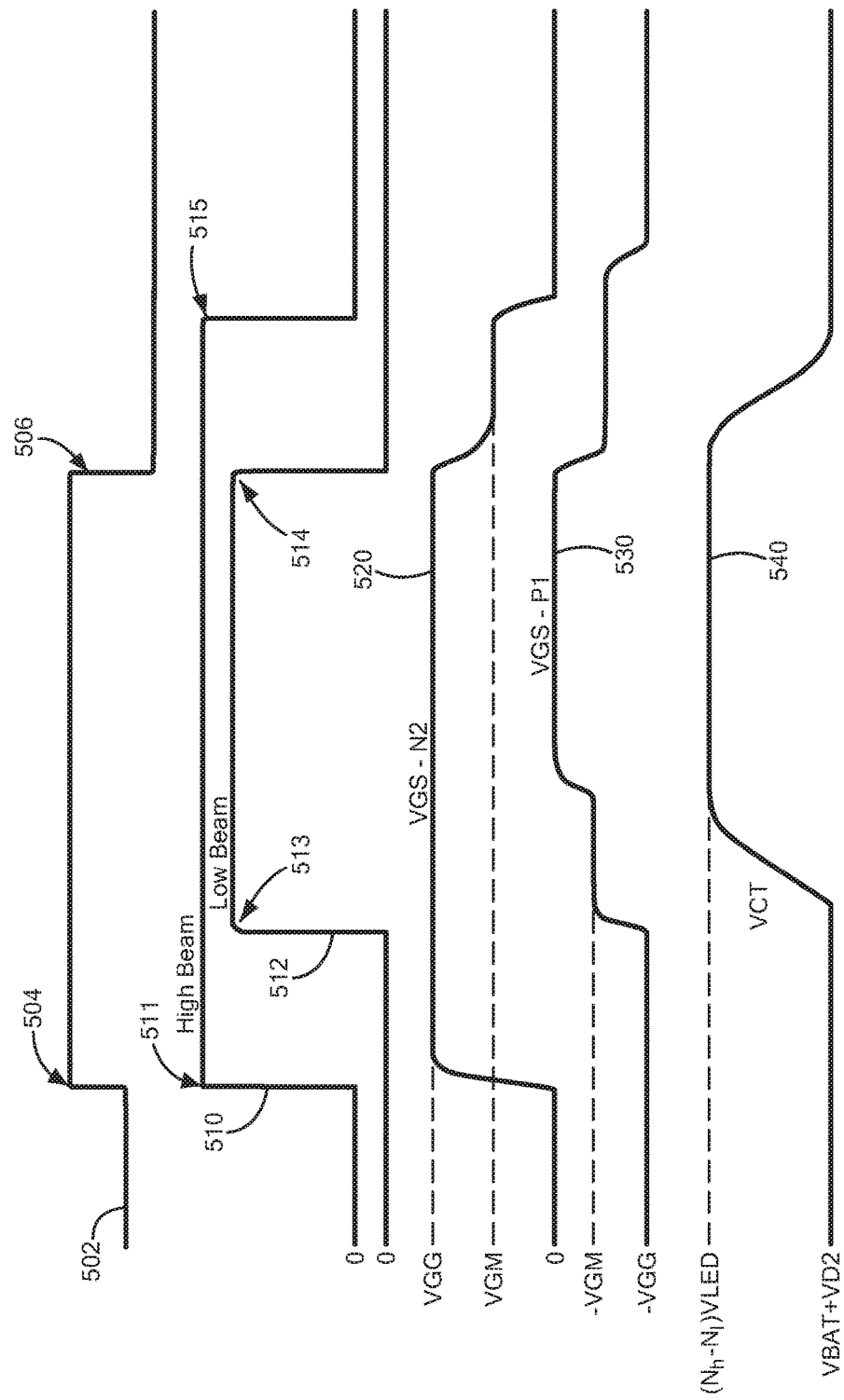
FIG. 5 shows waveforms associated with the circuit of FIG. 1 when the battery voltage is less than the intermediate node voltage, according to the present disclosure.

The current steering control circuit (gate drivers 130, 140) is configured to control the slew rate of only one of the first switch 120 or the second switch 122 during a transition between the Buck-Boost mode of operation and the Boost mode of operation. As described in greater detail herein, depending on the relative voltage of the intermediate node CT with respect to the battery voltage VBAT, either the switch 120 or the switch 122 has its slew rate controlled to improve the transition from Boost mode to Buck-Boost mode and vice versa. Refer, for example, to FIGS. 4-5 showing example waveforms of the transitions for each switch, with the slew rate being controlled for only one switch at a time.

Figure 2:
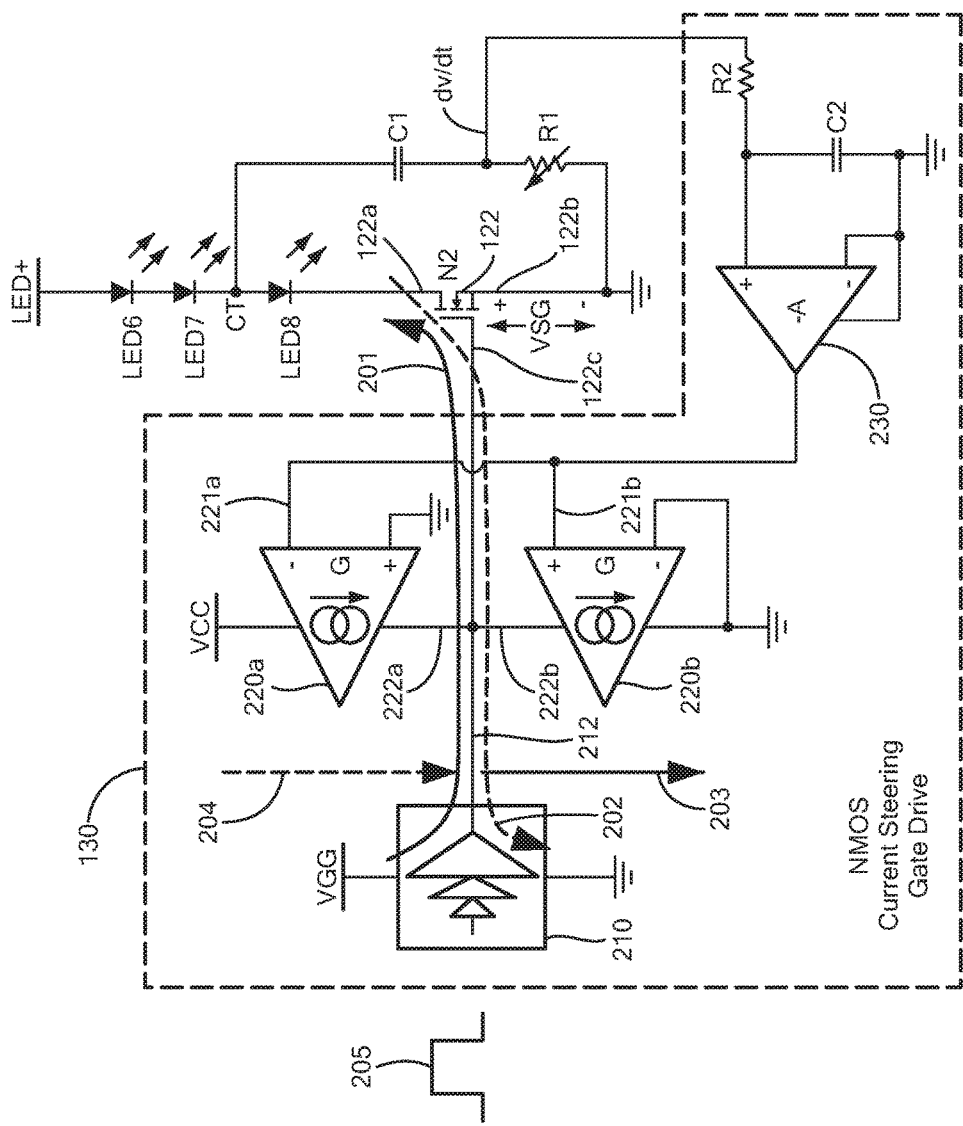
FIG. 2 is a schematic diagram of a portion of the circuit of FIG. 1 including a current steering gate driver coupled to a "Boost" switch, according to the present disclosure.
Figure 2A:
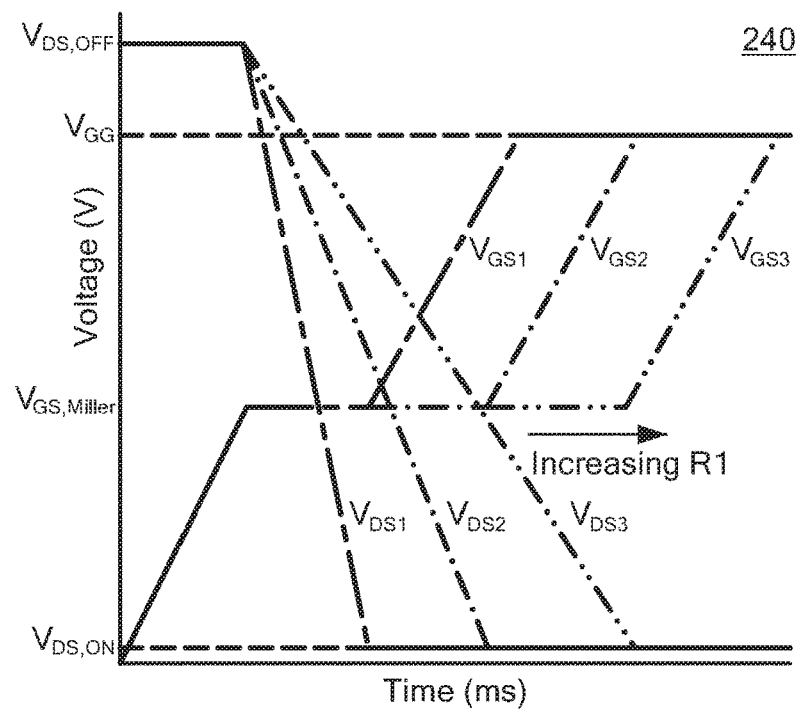
FIG. 2A is a graph illustrating example turn on characteristics of the Boost switch of FIG. 2, according to the present disclosure.
Figure 2B:
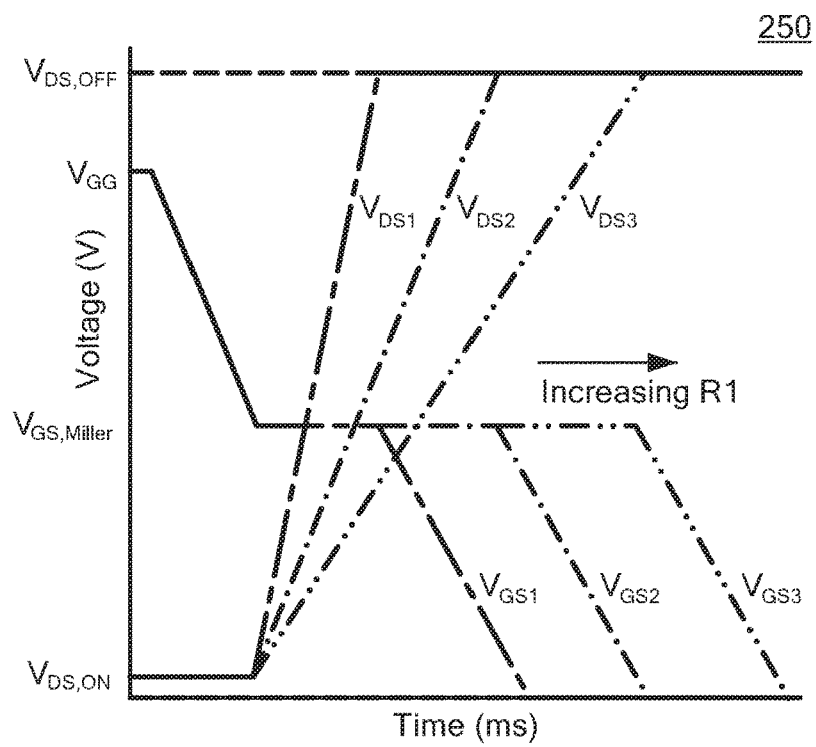
FIG. 2B is a graph illustrating example turn off characteristics of the Boost switch of FIG. 2, according to the present disclosure.

FIG. 2 is a schematic diagram showing a portion of the circuit of FIG. 1 including a current steering gate driver 130 coupled to the Boost switch 122, with the current steering gate driver circuit 130 shown in greater detail. It will be appreciated in light of the present disclosure that the current steering gate driver 130 may have the same structure as gate driver 140 (see, for example, FIG. 3) and differ in their connections to the respective switch that they control. In some embodiments, current steering gate driver 130 may have a different structure than current steering gate driver 140 and/or may respond to a different feedback voltage dv/dt to achieve a different slew rate for the switch that the driver controls. It will be appreciated that LED6 and LED7 of FIG. 2 can be the same as two of the LEDS (LED1-LED3) shown in FIG. 1 or can be different LEDs not shown in FIG. 1. Likewise, LED8 in FIG. 2 can be one of LED4 or LEDS shown in FIG. 1 or can be a different LED not shown in FIG. 1.

A converter configuration control signal 205 is received at the input to the current steering gate driver control circuit 130. Converter configuration control signal 205 can, for example, be the same signal as converter configuration control signal HB (high beam) shown in FIG. 1. The control circuit 130 includes a gate driver 210 having an input responsive to the converter configuration control signal 205 and an output 212 at which the switch control signal (e.g., signal 132 in FIG. 1) is provided. The current steering control circuit 130 further includes current steering amplifiers 220a, 220b each having, respectively, an input 221a, 221b coupled to receive the feedback voltage dv/dt through a negative feedback element 230 and an output 222a, 222b coupled to the control terminal 122c of the switch 122. The gain of the current steering amplifiers 220a, 220b is set to be constant, and the value of resistor R1 can be changed to modify the slew rate of the switch 122. The gain of the current steering amplifiers 220a, 220b are selected such that, with maximum adjustable slew rate, the steered current is equal to the minimum of the gate driver source current (refer, for example, to arrow 201 of FIG. 2) or sink current (refer, for example, to arrow 202 of FIG. 2). The current steering control circuit 130 can include a resistor R2 coupled to the input of the negative feedback element 230 and a capacitor C2 coupled across the inputs of the negative feedback element 230. The resistor R2 and capacitor C2 can operate as a low pass filter for removing the switching ripple.

In operation, the current steering gate driver 130 receives the converter configuration control signal HB 205 at the gate driver 210, for example indicating to turn on the switch 122 when this signal goes high. As described in greater detail below in connection with FIG. 4, if the battery voltage VBAT is greater than the intermediate load voltage CT, then the slew rate of Boost switch 122 is actively controlled on turn on and turn off in response to the feedback voltage dv/dt (and the slew rate of Buck-Boost switch 120 is not controlled). Under this operation condition, switch 122 can be considered to be in the low impedance path and switch 120 in the high impedance path. On the other hand, as described in greater detail below in connection with FIG. 5, if VBAT<VCT, then the slew rate of switch 120 (which switch is then in the low impedance path) is actively controlled on turn on and turn off in response to the feedback voltage dv/dt (and the slew rate of high impedance path switch 122 is not controlled). By "active" slew rate control, it is meant that the switch transition is controlled by a current steering gate driver 130 in response to feedback voltage dv/dt.

When the slew rate of switch 122 is controlled, gate current steering source amplifier 220a is used during the off transition as shown by arrow 204 and gate current steering sink amplifier 220b is used during the on transition as shown by arrow 203. More particularly, during turn on of switch 122, as shown by arrow 201, the gate current steering sink amplifier 220b delays turn-on of the switch 122 as shown by arrow 203 by sinking a level of current sufficient to control the slew rate based, in part on the value of resistor R1. During turn off of switch 122, as shown by arrow 202, the gate current steering source amplifier 220a delays turn off of the switch as shown by arrow 204 by sourcing a level of current sufficient to control the slew rate based in part on the value of resistor R1. FIG. 2A illustrates the turn on slew rates and the effect of changing R1 on the turn-on slew rates.

When VBAT<VCT and the slew rate of switch 122 is not actively controlled, switch 122 is permitted to quickly turn on and off with the amplifiers 220a, 220b essentially bypassed from the circuit because they are not affected by the feedback voltage dv/dt. Before turn off of switch 122, switch 120 will be turned on during overlap time (see, e.g., FIG. 5). When the switch 120 is being turned on actively with the slew control, the CT voltage (VCT) starts falling. With a negative dv/dt at CT, the amplifier 220b starts gate current steering even before switch 122 is commanded to turn off. This involuntary current steering due to the coupled dv/dt at CT aids in the quick turn off of switch 122.

FIG. 2A is a graph 240 illustrating example turn on characteristics of the Boost switch 122 of FIG. 2 and showing the drain-source voltage ($V_{DS}$) and gate-source voltage ($V_{GS}$) in Volts (in arbitrary units) as a function of time (in arbitrary units) for the switch. $V_{DS,OFF}$ is the drain-source voltage of the switch when it is off, and $V_{DS,ON}$ is the drain-source voltage of the switch when it is on. $V_{GG}$ is the absolute negative gate voltage of PMOS switch 120 and $V_{GS,\ MILLER}$ is the Miller voltage of the respective switch.

As shown in FIG. 2A, by increasing the resistance of resistor R1 (moving from left to right on the graph 240), the switch turn on slew rate increases. A value for R1 can be selected to achieve the desired slew rate for turning on a switch using the graph 240 of FIG. 2A, as will be appreciated.

FIG. 2B is a graph 250 illustrating example turn off characteristics of the Boost switch 122 of FIG. 2 and showing the drain-source voltage ($V_{DS}$) and gate-source voltage ($V_{GS}$) in Voltage (in arbitrary units) as a function of time (in arbitrary units) for the switch.

As shown in FIG. 2B, by increasing the resistance of resistor R1 (moving from left to right in the graph 250), the switch turn off slew rate increases. A value for resistor R1 can be selected to achieve the desired slew rate for turning off a switch using the graph 250 of FIG. 2B, as will be appreciated.

The graph 240 and associated slew rates, as well as graph 250 and associated slew rates, are applicable to the Boost switch 122 of FIG. 2.

Figure 2C:
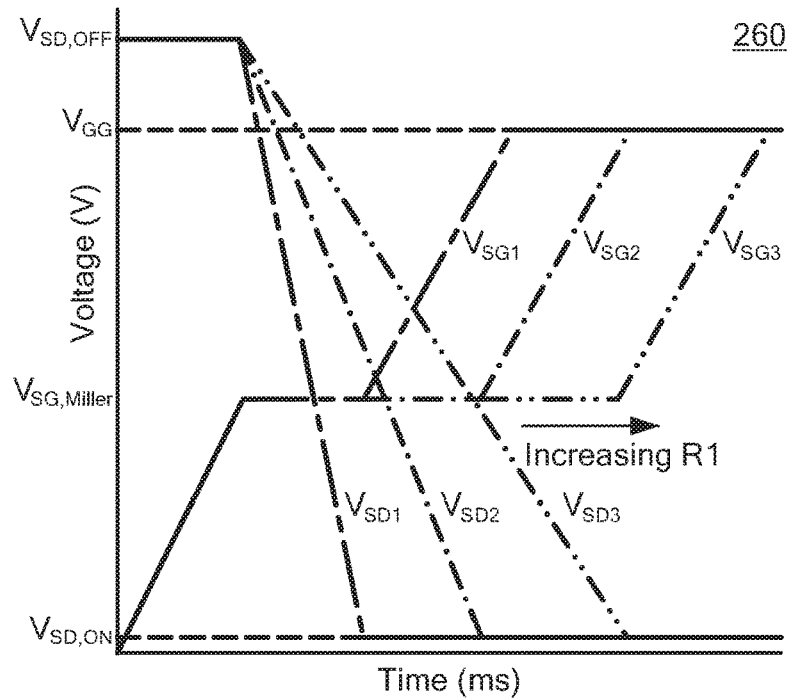
FIG. 2C is a graph illustrating example turn on characteristics of the Buck-Boost switch of FIG. 1, according to the present disclosure.

FIG. 2C is a graph 260 illustrating example turn on characteristics of the Buck-Boost switch 120 of FIG. 1 and showing the source-drain voltage ($V_{SD}$) and source-gate voltage ($V_{SG}$) in Volts (in arbitrary units) as a function of time (in arbitrary units) for the switch. $V_{SD,OFF}$ is the drain-source voltage of the switch when it is off, and $V_{SD,ON}$ is the drain-source voltage of the switch when it is on. $V_{GG}$ is the absolute negative gate voltage of PMOS switch 120 and $V_{SG,\ MILLER}$ is the Miller voltage of the respective switch.

As shown in FIG. 2C, by increasing the resistance of resistor R1 (moving from left to right on the graph 260), the switch turn on slew rate increases. A value for R1 can be selected to achieve the desired slew rate for turning on a switch using the graph 260 of FIG. 2C, as will be appreciated.

Figure 2D:
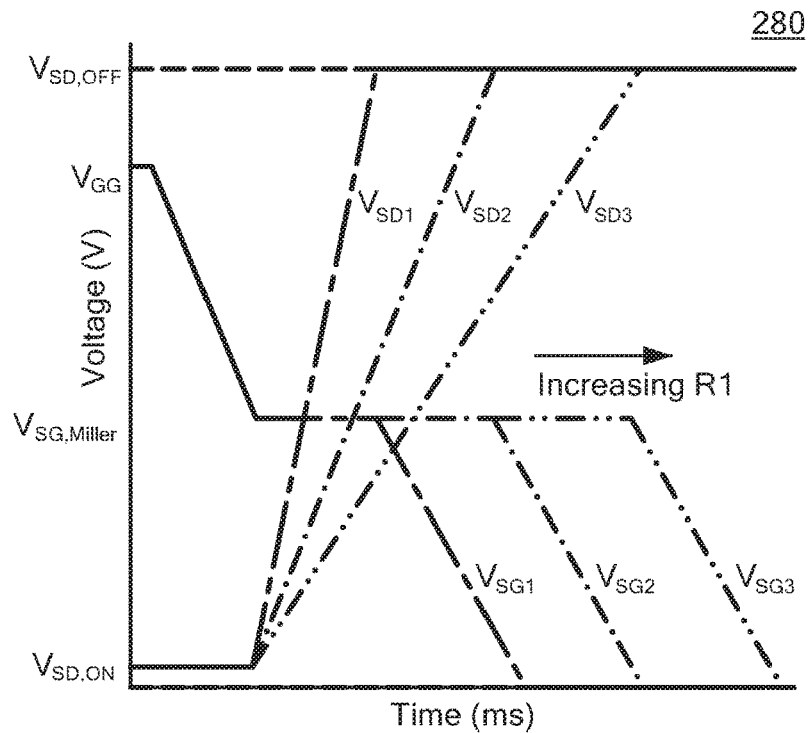
FIG. 2D is a graph illustrating example turn off characteristics of the Buck-Boost switch of FIG. 1, according to the present disclosure.

FIG. 2D is a graph 280 illustrating example turn off characteristics of the Buck-Boost switch 120 of FIG. 1 and showing the source-drain voltage ($V_{SD}$) and source-gate voltage ($V_{SG}$) in Voltage (in arbitrary units) as a function of time (in arbitrary units) for the switch.

As shown in FIG. 2D, by increasing the resistance of resistor R1 (moving from left to right in the graph 280), the switch turn off slew rate increases. A value for resistor R1 can be selected to achieve the desired slew rate for turning off a switch using the graph 280 of FIG. 2D, as will be appreciated.

Figure 3:
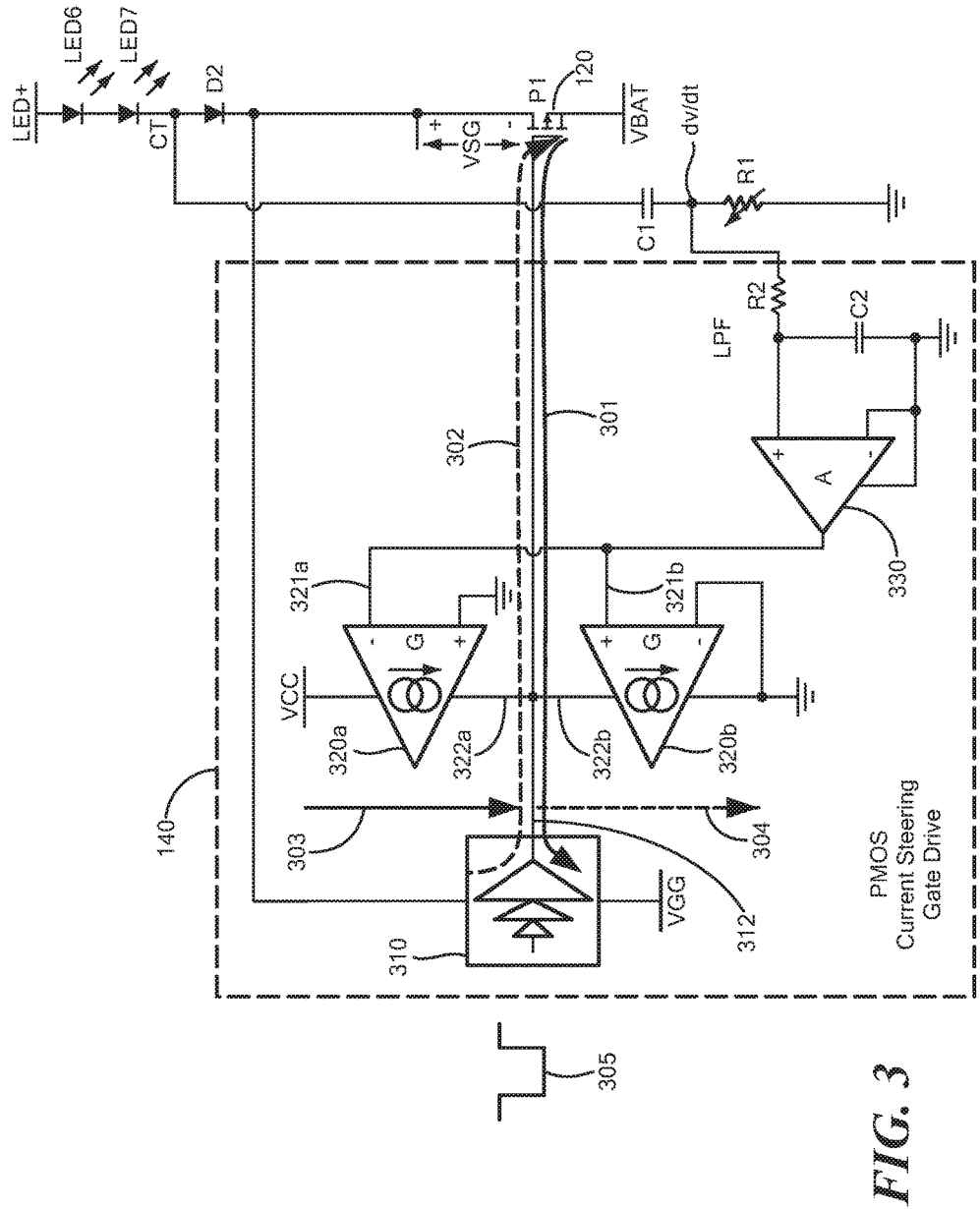
FIG. 3 is a schematic diagram of a portion of the circuit of FIG. 1 including a current steering gate driver coupled to a "Buck-Boost" switch, according to the present disclosure.

FIG. 3 is a schematic of a portion of the circuit of FIG. 1 including a current steering gate driver 140 coupled to the Buck-Boost switch 120, with the current steering gate driver circuit 140 shown in greater detail. It will be appreciated in light of the present disclosure that the gate driver 140 can have the same structure as gate driver 130 (see FIG. 2) and differ in their connections to the switch that they control. In some embodiments, current steering gate driver 140 may have a different structure than current steering gate driver 130 and/or may respond to a different feedback voltage dv/dt to achieve a different slew rate for the switch that the driver controls. It will be appreciated that LED6 and LED7 can be the same as two of the LEDS (LED1-LED3) shown in FIG. 1 or can be different LEDs not shown in FIG. 1. Likewise, LED8 in FIG. 3 can be LED4 or LED5 shown in FIG. 1 or can be a different LED not shown in FIG. 1.

A converter configuration control signal 305 is received at the input to the current steering gate driver control circuit 140. Converter configuration control signal 305 can, for example, be the same as converter configuration control signal LB (low beam) shown in FIG. 1. The control circuit 140 includes a gate driver 310 having an input responsive to the converter configuration control signal 305 and an output 312 at which the switch control signal (e.g., signal 142 in FIG. 1) is provided. The current steering control circuit 140 further includes current steering amplifiers 320a, 320b each having, respectively, an input 321a, 321b coupled to receive the feedback voltage dv/dt through a negative feedback element 330 and an output 322a, 322b coupled to the control terminal of the switch 120. The gain of the current steering amplifiers 320a, 320b is set to be constant, and the value of resistor R1 can be changed to modify the slew rate of the switch 120. The gain of the current steering amplifiers 320a, 320b are selected such that, with a maximum adjustable slew rate, the steered current is equal to the minimum of the gate driver source current (refer, for example, to arrow 302 of FIG. 3) or sink current (refer, for example, to arrow 301 of FIG. 3). The current steering control circuit 140 can include a resistor R2 coupled to the input of the negative feedback element 330 and a capacitor C2 coupled across the inputs of the negative feedback element 330. The resistor R2 and capacitor C2 can operate as a low pass filter to remove switching ripple.

In operation, the current steering gate driver 140 receives the converter configuration control signal LB 305 at the gate driver 310, for example indicating to turn on the switch 120 when this signal goes high. If the battery voltage VBAT is less than the intermediate load voltage CT, then the slew rate of Boost switch 120 is actively controlled to turn on and off in response to the feedback voltage dv/dt. When the slew rate of turning on switch 120 is controlled, gate current steering sink amplifier 320b is used during the off transition as shown by arrow 304 and the gate current steering source amplifier 320a is used during the on transition as shown by arrow 303. More particularly, during turn off of switch 120 as shown by arrow 302, sink amplifier 320b delays turn off of switch 120 as shown by arrow 304 by sinking a level of current sufficient to control the slew rate based in part on the value of resistor R1. During turn on of switch 120 as shown by arrow 301, source amplifier 320a delays turn on of switch 120 as shown by arrow 303 by sourcing a level of current sufficient to control the slew rate based in part on the value of resistor R1. FIG. 2A illustrates the turn on slew rates and the effect of changing R1 on the turn on slew rates.

When VBAT<VCT and the slew rate of switch 120 is not actively controlled, switch 120 is permitted to quickly turn on with the amplifiers 320a, 320b essentially bypassed from the circuit because they are not affected by the feedback voltage dv/dt. Before turn off of switch 120, switch 122 will be turned on during overlap time (see, for example, FIG. 5). When the switch 122 is being turned on actively, with slew control, the CT voltage (VCT) starts falling. With a negative dv-dt at CT, amplifier 320b starts gate current steering even before switch 120 is commanded to turn off. This involuntary current steering due to coupled dv/dt at CT aids in quick turn off of switch 120.

Thus, depending on the relative voltage levels of the battery voltage VBAT and the intermediate load voltage CT, during the transition time periods between the Boost and Buck-Boost modes of converter operation, the slew rate of only one of the first switch 120 or the second switch 122 is controlled at a time (i.e., during the particular mode transition). This arrangement results in improved performance of the circuit by speeding up transitions at appropriate times. For example, if the slew rate of both switches were controlled this would result in unnecessarily slow transitions between the low beam configuration and the high beam configuration. By controlling only the MOSFET in the low impedance path, the other FET (in the high impedance path) can turn on (or off) quickly and the overall performance and speed of the part can be improved.

Reference is now made to FIG. 4 showing waveforms associated with the circuit of FIG. 1 when the battery voltage VBAT is greater than the output voltage intermediate load voltage CT. In accordance with the present disclosure, when VBAT>VCT, the slew rate of switch 122 is controlled and the slew rate of switch 120 is not controlled.

As shown in FIG. 4, a load configuration command signal 402 is provided which, for example, can indicate to turn on high beams for a vehicle at 404, and to turn off the high beams at 406. The load configuration command signal 402 can be used to generate the HB and LB converter configuration control signals 410, 412 (that can be the same as or similar to the HB signal 205, and the LB signal 305 of FIGS. 2 and 3, respectively). More particularly, in response to a first transition 404 of the load configuration command signal 402, converter configuration control signal 410 can be caused to transition substantially immediately at 411 and then, following a predetermined delay, or overlap time, signal 412 can be caused to transition as indicated at 413. And in response to a second transition 406 of the load configuration command signal 402, converter configuration control signal 412 can be caused to transition substantially immediately at 414 and then, following a predetermined delay, or overlap time, signal 410 can be caused to transition as indicated at 415. The overlap time delay is necessary to ensure the LED strings do not transition (i.e., turn off) at the same time. For example, if the overlap time is not implemented, there is a chance for both switches 120 and 122 to be off. If this happens, the output voltage (LED+ terminal in FIG. 1) of the switching converter increases rapidly and it triggers overvoltage protection. Overlap time can be either fixed or variable. If a fixed overlap time is implemented, it is usually selected as a percentage (e.g., approximately 30 to 40%) of the maximum adjustable transition time. The higher the percentage, the lower is the loss in the switch (either switch 120 or 122) which is turning on. An optimal overlap time can be implemented by adaptively adjusting it so that is it the same as (or substantially similar to) the transition time. If a fixed overlap time is implemented, it is the same at both turn on and turn off of the high beam. If an adaptive overlap time is implemented, the overlap times will vary and be different. The HB converter configuration control signal 410 is received by driver (e.g., driver 210 in FIG. 2) and is used to generate switch control signal 132 (FIG. 1) that controls the switch 122. The LB converter configuration control signal 412 is received by a driver (e.g., driver 310 in FIG. 3) and is used to generate switch control signal 142 (FIG. 1) that controls the switch 120. Waveform 440 shows the intermediate load voltage CT.

As is apparent from the gate-source voltage of switch 122 illustrated by waveform 420, when the converter configuration control signal 410 goes high, switch 122 is turned on in a controlled manner by the current steering circuitry of driver 130 shown in FIG. 2. And when converter configuration control signal 410 goes low at 415, switch 122 is turned off in a controlled manner by the current steering circuitry of driver 130 shown in FIG. 2.

As is apparent from the gate-source voltage of switch 120 illustrated by waveform 430, when converter configuration control signal 412 goes high at 413 after the delay, switch 120 is turned off quickly, without active slew control. And when converter configuration control signal 412 goes low at 414, switch 120 turns on quickly, without active slew rate control.

Reference is now made to FIG. 5 showing waveforms associated with FIG. 1 when the battery voltage VBAT is less than the intermediate load voltage CT. In accordance with the disclosure, when VBAT<VCT, the slew rate of switch 120 is actively controlled and the slew rate of switch 122 is not controlled. An example load configuration command signal 502 is shown that can indicate to turn on high beams at a first transition 504 and turn off high beams at a second transition 506 for example. Signal 502 can be the same as signal 402 (FIG. 4) and thus, can be used to generate a high beam converter configuration control signal 510 (that can be the same as or similar to the HB signal 205 of FIG. 2) and the LB converter configuration control signal 512 (that can be the same as or similar to the LB signal 305 of FIG. 3). Thus, signals 510 and 512 can have a delay between positive-going transitions 511, 513 and can have a delay between negative-going transitions 514, 515, as shown. The HB converter configuration control signal 510 is received by a driver (e.g., driver 210 in FIG. 2) and is used to generate switch control signal 132 (FIG. 1) to control switch 122. The LB converter configuration control signal 512 can be received by a driver (e.g., driver 310 in FIG. 3) and is used to generate switch control signal 142 (FIG. 1) to control switch 120. Also shown is the intermediate load voltage CT.

As is apparent from the gate-source voltage of switch 120 illustrated by waveform 530, when the converter configuration control signal 512 goes high at 513, switch 120 is turned on in a controlled manner by the current steering circuitry of driver 140 shown in FIG. 3. And when converter configuration control signal 512 goes low at 514, switch 120 is turned off in a controlled manner by the current steering circuitry of driver 140 shown in FIG. 2.

As is apparent from the gate-source voltage of switch 122 illustrated by waveform 520, when converter configuration control signal 510 goes high at 511, switch 122 turns off quickly, without active slew control. And when converter configuration control signal 512 goes low at 514, switch 122 turns on quickly, without active slew rate control.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Having described preferred embodiments of the present disclosure, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A driver coupled to a configurable load having a first load portion coupled to a second load portion at an intermediate node, the load powered by a load voltage generated by a converter powered by a battery voltage, the driver comprising:
   a first switch having a first terminal coupled to the intermediate node of the load and a second terminal coupled to the battery voltage and not coupled to the second load portion;

a second switch having a first terminal coupled to the second load portion and a second terminal coupled to a reference potential; and a current steering control circuit responsive to a feedback voltage associated with the intermediate node, wherein the current steering control circuit is configured to generate a first switch control signal for coupling to a control terminal of the first switch and to generate a second switch control signal coupling to a control terminal of the second switch.

2. The driver of claim 1 wherein the first and second switch control signals cause the first switch to be on and the second switch to be off during a Buck-Boost mode of converter operation and cause the second switch to be on and the first switch to be off during a Boost mode of converter operation.

3. The driver of claim 2 wherein the load comprises a headlamp, wherein the first load portion comprises a first plurality of series-coupled LEDs corresponding to a low beam configuration in which the converter is in the Buck-Boost mode of operation and wherein the second load portion comprises a second plurality of series-coupled LEDs that, with the first plurality of series-coupled LEDs, correspond to a high beam configuration in which the converter is in the Boost mode of operation.

4. The driver of claim 3, wherein the headlamp comprises an automotive headlamp.

5. The driver of claim 2 wherein the current steering control circuit is configured to detect a rate of change of the feedback voltage and control a slew rate of the first switch control signal and the second switch control signal based on the detected rate of change of the feedback voltage.

6. The driver of claim 5 wherein the current steering control circuit is configured to control the slew rate of only one of the first switch control signal or the second switch control signal during a transition between the Buck-Boost mode of operation and the Boost mode of operation.

7. The driver of claim 1 wherein, for each of the first switch and the second switch, the current steering control circuit comprises:

a gate driver having an input responsive to a converter configuration control signal that controls a configuration of the load and an output at which the respective switch control signal is provided; and a current steering amplifier having an input coupled to the intermediate node through a negative feedback element and an output coupled to the control terminal of the respective switch.

8. The driver of claim 1 further comprising an RC circuit having a capacitor coupled to the intermediate node of the load and a resistor coupled between the capacitor and a reference voltage, wherein the feedback voltage is provided between the capacitor and the resistor.

9. The driver of claim 8 wherein the resistor comprises a variable resistor selected to establish the slew rate of the first switch control signal and the second switch control signal.

10. A method of configuring a load having a first load portion coupled to a second load portion at an intermediate node, the load powered by a load voltage generated by a converter powered by a battery voltage, the method comprising:

controlling a first switch having a first terminal coupled to the intermediate node of the load and a second terminal coupled to the battery voltage and not coupled to the second load portion and a second switch having a first terminal coupled to the second load portion and a second terminal coupled to a reference potential so that the first switch is on and the second switch is off during a Buck-Boost mode of converter operation and so that the first switch is off and the second switch is on during a Boost mode of converter operation; and steering a current at an output of a gate driver coupled to the intermediate node by a current steering control circuit responsive to a feedback voltage associated with the intermediate node.

11. The method of claim 10, wherein controlling comprises:

generating a first switch control signal, by the current steering control circuit, for coupling to a control terminal of the first switch in response to a rate of change of the feedback voltage associated with the intermediate node; and generating a second switch control signal, by the current steering control circuit, for coupling to a control terminal of the second switch in response to the rate of change of the feedback voltage associated with the intermediate node.

12. The method of claim 11 wherein during a transition of the converter into the Buck-Boost mode of operation:

the first switch control signal controls the slew rate of the first switch and the second switch control signal does not control the slew rate of the second switch if a voltage at the intermediate node is greater than the battery voltage; and the first switch control signal does not control the slew rate of the first switch and the second switch control signal controls the slew rate of the second switch if the voltage at the intermediate node is less than the battery voltage.

13. The method of claim 12 wherein each of controlling the slew rate of the first switch and controlling the slew rate of the second switch comprises:

generating a gate drive signal with a gate driver having an input responsive to a converter configuration control signal that controls a configuration of the load and an output at which the respective switch control signal is provided; and steering the current at the output of the gate driver with a current steering amplifier having an input coupled to the intermediate node through a negative feedback element and an output coupled to the control terminal of the respective switch.

14. An apparatus for configuring a load having a first load portion coupled to a second load portion at an intermediate node, the load powered by a load voltage generated by a converter powered by a battery voltage, the apparatus comprising:

means for controlling a first switch having a first terminal coupled to the intermediate node of the load and a second terminal coupled to the battery voltage and not coupled to the second load portion and a second switch having a first terminal coupled to the second load portion and a second terminal coupled to a reference potential so that the first switch is on and the second switch is off during a Buck-Boost mode of converter operation and so that the first switch is off and the second switch is on during a Boost mode of converter operation; and means for steering a current at an output of a gate driver coupled to the intermediate node responsive to a feedback voltage associated with the intermediate node.

15. The apparatus of claim 14, wherein the means for controlling comprises:

means for generating a first switch control signal for coupling to a control terminal of the first switch in response to a rate of change of the feedback voltage associated with the intermediate node; and means for generating a second switch control signal for coupling to a control terminal of the second switch in response to the rate of change of the feedback voltage associated with the intermediate node.

16. The apparatus of claim 15 wherein during a transition of the converter into the Buck-Boost mode of operation:

the first switch control signal controls the slew rate of the first switch and the second switch control signal does not control the slew rate of the second switch if a voltage at the intermediate node is greater than the battery voltage; and the first switch control signal does not control the slew rate of the first switch and the second switch control signal controls the slew rate of the second switch if the voltage at the intermediate node is less than the battery voltage.

17. The apparatus of claim 16 wherein each of the means for controlling the slew rate of the first switch control signal and the means for controlling the slew rate of the second control signal comprises:

means for generating a gate drive signal with a gate driver having an input responsive to a converter configuration control signal that controls a configuration of the load and an output at which the respective switch control signal is provided; and means for steering the current at the output of the gate driver with a current steering amplifier having an input coupled to the intermediate node through a negative feedback element and an output coupled to the control terminal of the respective switch.

* * * * *

UNITED STATES PATENT AND TRADEMARK OFFICE
CERTIFICATE OF CORRECTION

PATENT NO. : 10,411,600 B1
APPLICATION NO. : 16/259103
DATED : September 10, 2019
INVENTOR(S) : Sutej Reddy Challa et al.

It is certified that error appears in the above-identified patent and that said Letters Patent is hereby corrected as shown below:

In the Specification

Column 7, Line 40 delete "LEDS" and replace with --LED5--.

Column 8, Lines 10-11 delete "controlled on turn on and turn off" and replace with --controlled to turn on and off--.

Column 8, Lines 19-20 delete "controlled on turn on and turn off" and replace with --controlled to turn on and off--.

Column 9, Line 4 delete "in voltage" and replace with --in volts--.

Column 9, Line 34 delete "in voltage" and replace with --in volts--.

Column 9, Line 56 delete "LEDS" and replace with --LED5--.

Signed and Sealed this
Eleventh Day of August, 2020

Andrei Iancu
*Director of the United States Patent and Trademark Office*